United States Patent [19]

Aron

[11] 3,882,062

[45] May 6, 1975

[54] NOVEL PROCESSING AIDS FOR NATURAL AND SYNTHETIC RUBBER COMPOUNDS

[75] Inventor: Erwin Aron, Clifton, N.J.

[73] Assignee: Technical Processing, Inc., Paterson, N.J.

[22] Filed: Jan. 3, 1974

[21] Appl. No.: 430,566

Related U.S. Application Data

[63] Continuation-in-part of Ser. No. 421,689, Dec. 4, 1973, which is a continuation-in-part of Ser. No. 411,975, Nov. 1, 1973, abandoned.

[52] U.S. Cl. ............... 260/23.7 M; 252/41; 252/52; 260/31.4; 260/33.4; 260/33.6; 260/38.2; 360/38.4; 260/45.75 R; 260/458 R
[51] Int. Cl. ............................................ C08c 11/72
[58] Field of Search .. 260/23.7 M, 45.75 R, 45.8 R, 260/752, 314, 33.4, 33.6, 38.2, 38.4; 252/40; 11/52

[56] References Cited

UNITED STATES PATENTS

| | | | |
|---|---|---|---|
| 2,500,858 | 3/1950 | Pape | 260/752 |
| 2,904,522 | 9/1959 | Catlin | 260/45.75 R |
| 3,201,361 | 8/1965 | Aron | 260/752 |
| 3,437,621 | 4/1969 | Aron | 260/33.4 R |
| 3,448,067 | 6/1969 | Penneck | 260/23 |
| 3,549,587 | 12/1970 | Nicholson | 260/45.8 R |
| 3,787,341 | 1/1974 | Aron | 260/23.7 M |

*Primary Examiner*—Melvyn I. Marquis
*Assistant Examiner*—William E. Parker
*Attorney, Agent, or Firm*—Kenyon & Kenyon

[57] ABSTRACT

Compositions containing salts of aromatic sulfonic acids, long chain fatty acids and thioethers are useful in the processing of natural and synthetic rubber by permitting the usual peptizing step of such processing to be omitted.

17 Claims, No Drawings

NOVEL PROCESSING AIDS FOR NATURAL AND SYNTHETIC RUBBER COMPOUNDS

This application is a continuation-in-part of my prior application Ser. No. 421,689 filed Dec. 4, 1973 for "Novel Processing Aids for Natural and Synthetic Rubber Compounds," which in turn is a continuation-in-part of application Ser. No. 411,975 filed Nov. 1, 1973, now abandoned, of the same title.

BACKGROUND OF THE INVENTION

Crude natural rubber is generally quite high in viscosity and therefore does not mix easily and quickly with the many additives used during processing. To facilitate the addition of these additives, the rubber usually is softened by undergoing a preliminary step called mastication.

The rubber is placed into a usual mixer, such as the Banbury, and is subjected to heat and a plasticizer (peptizer), while being mixed for several minutes. The resulting mixture is then dumped, sheeted on a roll mill and cooled. The softened rubber then undergoes the mixing step.

The processing aids of my earlier copending application Ser. No. 263,752 filed June 12, 1972 now U.S. Pat. No. 3,787,341 issued Jan. 22, 1974 were developed to eliminate the need for the mastication step. These compositions are added directly to the crude rubber in the mixing cycle along with the other additives. In addition to facilitating the breaking of the polymer and the elimination of the need for both the mastication step and the peptizer, these compositions have other beneficial effects in rubber compounding. They reduce the mixing time required for rubber compounding and provide for better dispersal of additives than traditional methods. In addition, they enable the use of lower mixing temperatures and provide for improved flow, improved physical properties, improved mixing and extruding characteristics, and improved physical characteristics of the rubber. Hence, even the compounding of synthetic rubber requiring no premastication will be enhanced by the use of these formulations.

The compositions of my prior invention are homogeneous mixtures of:

1. alkali salts of aromatic sulfonic acids having the general formula:

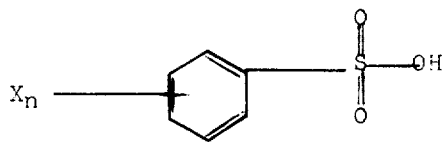

wherein X can be either hydrogen or a branched or straight chain alkyl group from 4 to 14 carbon atoms, and preferably about 8 to 12 carbon atoms; and n has a value of from 1 to 5, and preferably 1; and 2. long chain fatty acides having a maximum of about 22 carbon atoms in the chain, such as, but not limited to, stearic acid, palmitic acid, oleic acid, neodecanoic acid and mixtures of such acids. The fatty acids should be present in amounts at least about equal to the amount of sulfonates but may be present in substantial excess if desired.

It has been found in accordance with this invention that thioethers catalyze the action of my prior compositions. In particular, they promote futher reduction in the viscosity of the rubber compound. This results in a reduced energy input to effect compounding. In addition, it enables mixing of the rubber compound at lower temperatures, thereby minimizing the danger of scorching the rubber compound.

The thioethers which are employed in accordance with this invention are those of the formula:

$$R^1\text{-}Y\text{-}R^2$$

wherein Y is sulfur or dithioalkylene, i.e., $-SC_xH_{2x}S-$ wherein x has a value of from 1 to about 5, and preferably is 1; and each of $R^1$ and $R^2$ is alkyl, aryl, alkaryl, aralkyl as well as substituted alkyl, aryl, alkaryl and aralkyl. The precise nature of $R^1$ and $R^2$ is not highly critical, provided the thioether is sufficiently non-volatile to remain in the rubber compound for a sufficient period of time to provide effective catalyzing action. In general, thioethers having boiling points in excess of about 130°C are sufficiently non-volatile to be useful in accordance with the invention. In addition, the size of the compound should be such that sufficient catalytic activity can be imparted with relatively small amounts of thioether. Accordingly, each of $R^1$ and $R^2$ preferably contains no more than about 12 carbon atoms. Lastly, substituents, if any, should be inert and compatible with the compounds of his invention as well as with the ultimate rubber compound into which they will be incorporated. Suitable substituents include ether oxygen, carbonyl oxygen (i.e., keto, ester and carboxyl groups), cyano, amine nitrogen (primary, secondary or tertiary), amide groups and the like.

A preferred class of thioethers comprises thiodicarboxylic acids and their lower alkyl ethers of the formula:

$$Y \{C_zH_{2\overline{z-a}}(CO_2R^3)_{1+a}\}_2$$

wherein Y is as defined above; z is a number having a value of from 1 to about 2; a is a number having a value of from about 0 to about 1; and $R^3$ is hydrogen or lower alkyl of up to about 3 carbons. Typical thioethers include thio-diglycolic acid, thiodipropionic acid, methylene bis(thioacetic acid), dimethyl thiodipropionate, thiodisuccinic acid, thiodipropionitrile, and dibenzyl sulfide.

The thioether is believed to act as a catalyst. In particular, it is believed that the alkali metal sulfonate component of my prior composition is converted in part into the corresponding sulfonic acid which acts as a peptizer during the compounding process, and that the thioether catalyzes the peptizing action of the sulfonic acid. This theory is offered solely by way of explanation, however, and it is not intended to limit the invention to this theory.

Regardless of theory, the amount of thioether sufficient to achieve a reduction in compound viscosity and mixing temperature is small. In general it will be from about 5 to about 10 per cent, based upon the weight of the sulfonate salt, or from about 1 to about 3 per cent based upon the combined weight of sulfonate salt and fatty acid.

The resulting composition is blended with the rubber at the beginning of the mixing cycle. The amount of the composition necessary to achieve improved compounding ordinarily is from about 0.5 to about 2 per cent, and preferably about 0.9 to about 1.5 per cent, based upon the weight of the rubber in the compound.

As a result, the thioether is present in the compound at levels of only 0.005 to about 0.06 per cent, based upon the rubber. Nonetheless, the incorporation of such small amounts of the thioether has a material effect on reducing compound viscosity and compounding temperatures.

The composition of this invention preferably is mixed with suitable materials to facilitate its introduction into the rubber. Such materials include esters and ethers of aromatic alcohols, acids, etc. These additional materials are preferably similar to the materials comprising the composition of the invention of my copending application, Ser. No. 128,549, of Mar. 26, 1971. These generally are aromatic esters, compounds with alcoholic and glycolic hydroxyl groups, potassium or sodium soaps of fats or fatty acids, metal soaps of zinc, magnesium, calcium or barium, and a paraffin. Specifically, these additional materials may comprise:

a. From about 5 to about 15 percent aromatic esters selected from groups consisting of (1) diaryl- and di-arylalkyl phthalates, (2) diaryl- and arylalkyl mono-glycolether phthalates, (3) phthalates from polyglycol mono-ethers of aryl, aralkyl and alkaryl compounds wherein the polyglycol chain contains from 2 to 6 ethylene oxide groups in the chain, (4) di-benzoates of glycol and propyleneglycol, and their di- and tri-mers; and (5) mixtures of the above.

b. From about 5 to about 30 percent of compounds with alcoholic or glycolic hydroxyl groups selected from (1) straight or branched chain aliphatic alcohols having from about 8 to about 20 carbons in the chain, (2) alkyl-phenoxy ethers of glycols or polyglycols wherein the alkyl group is limited to about 12 carbons in the chain, and the polyglycol grouping does not contain more than about 6 ($CH_2$—$CH_2$—O—) groups, (3) polypropylene glycol of about three propylene oxide groups in the molecule, and (4) mixtures of the above.

c. From about 5 to about 15 percent of potassium or sodium soaps made from commercial mixtures of fats or fatty acids containing from about 12 to about 18 carbon atoms in the chain, said chains having only a small degree of unsaturation, with more than 50 percent of them having 18 carbon atoms in the chain.

d. From about 10 to about 30 percent of fatty acids having from about 12 to about 18 carbon atoms in the chain, said chains having only a small degree of unsaturation, with more than 50 percent of them having 18 carbon atoms in the chain.

e. From about 5 to about 10 percent of a metal soap where the metal is selected from the group consisting of zinc, magnesium, calcium, or barium; and the fatty acid part of the soap has from about 12 to about 18 carbon atoms in the chain and contains a high percentage of chains with a single double bond in the chain.

f. From about 15 to about 60 percent of hydrocarbons selected from the group consisting of mineral oil, mineral waxes, and petrolatum, or mixtures of them.

Preferably the potassium or sodium soaps of (c) above or the fatty acids of (d) above are compounds which have iodine values in the range of from about 5 to about 15. The metal soaps of (e) above are more unsaturated and have iodine values in the range of about 80 to about 95.

Typical aromatic esters of (a) above which may be used in the compositions of this invention are dibenzyl phthalate; diphenyl phthalate; bis(2-phenoxyethyl) phthalate; bis(nonylphenoxyethyl) phthalate; bis(nonylphenoxytetraethyleneglycol) phthalate; benzyl dodecylphenoxyhexaethyleneglycol phthalate; bis(octylphenoxy) hexaethyleneglycol phthalate; diethyleneglycol dibenzoate; dipropyleneglycol dibenzoate; and triethyleneglycol dibenzoate.

Illustrative of the compounds with alcoholic or glycolic hydroxyl groups referred to in (b) above which may be employed are 2-ethylhexanol, cetyl alcohol, stearyl alcohol, nonylphenoxyglycol, nonylphenoxydiglycol, nonylphenoxytetraethyleneglycol, dodecylhexaethyleneglycol, dipropyleneglycol, tripropyleneglycol.

Among the potassium or sodium soaps referred to in (c) above are sodium and potassium soaps of hydrogenated tallow, hydrogenated oils of vegetable or marine origin, and soaps of potassium or sodium made with fractions prepared from oils and fats, such fractions having iodine values from about 5 to about 15.

Typical fatty acids which may be employed are those derived from hydrogenated tallow and hydrogenated oils of vegetable or marine origin.

Illustrative of the fatty acids part of the metal soaps referred in (e) above are oils of vegetable origin or fractions of animal fatty acids such as red oil.

Among the petroleum jellies, mineral oils, and mineral waxes, which may be employed in the compositions of this invention, are waxes having melting points of about 120° to 170°F.

However, compositions of this invention are not limited to use in combination with the above additional materials and any similar chemicals will suffice. All ingredients may be of technical grade and may contain varying amounts of related materials, by-products, etc. The novel rubber processing aids of this invention can be made by melting the ingredients together, mixing and cooling, forming a waxy solid. The additional materials may be added together with the sulfonic acid salt, fatty acid and thioether and all components heated until a clear melt is obtained. The alkali soaps and soaps of the bivalent metals can also be made in situ as is well known in the art, from the oxide, hydroxide or carbonate of the metal and the desired acids or acid anhydrides, followed by the evaporation or boiling off of the resulting water.

A preferred formulation for balanced processing aids of this invention contains the following approximate percentages by weight of compounds which are typical of their class:

3 to 15 percent alkali salt of aromatic sulfonic acid
5 to 25 percent fatty acid
0.5 to 1.5 percent thioether
7 to 15 percent diphenylphthalate
10 to 20 percent tetraethyleneglycol mono-nonylphenol ether
5 to 10 percent tripropyleneglycol
5 to 20 percent potassium stearate
4 to 10 percent zinc oleate
0 to 5 percent cetyl alcohol
15 to 40 percent petrolatum In general, the above-described compositions are solids. It is desirable that they be in liquid form to facilitate mixing of the composition with the rubber compound. Such liquid compositions can be achieved by the use of amine salts of the aromatic sulfonic acids disclosed above. The salts are those of amines of the formula:

and

Wherein $R^4$ is alkyl or hydroxyalkyl, each of $R^5$ or $R^6$ is hydrogen, alkyl or hydroxyalkyl, and n is a number having a value of from 2 to 5. Preferred amines are those having a molecular weight of at least 149 which are themselves liquid and react with the aromatic sulfonic acid to form a liquid salt. Preferred amines are tertiary amines, with triethanolamine being especially preferred.

The aromatic sulfonic acid amine salt can be preformed or it can be formed in situ by adding the acid and the amine separately. In the latter case, the aromatic sulfonic acid and the amine are added in approximately equivalent amounts.

The amine salt of the sulfonic acid, the carboxylic acid and the thioether can be mixed with certain of the ingredients (a)–(f) discussed above and still afford a liquid formulation. In particular, the aromatic esters (a), the alcoholic compounds (b), and the hydrocarbon (f) can be employed. However, the metal soaps (c) and (e) are to be avoided if a liquid formulation is desired. As a result, the proportions of the additional materials are appropriately adjusted to reflect the omission of these components as follows:

5.5 to 20 percent of ester (a)
5.5 to 38 percent of alcoholic compound (b)
5.5 to 38 percent of acid (d), and
16 to 75 percent of hydrocarbon (f)

Preferred liquid formulations contain:
20 to 25 percent amine salt of aromatic sulfonic acid
15 to 25 percent fatty acid
0.5 to 1.5 percent thioether
5 to 15 percent dipropylene glycol dibenzoate
20 to 25 percent tetraethyleneglycol mono-nonylphenol ether
5 to 15 percent tripropyleneglycol
10 to 20 percent mineral oil As noted above, the compositions of this invention generally are added to the rubber at the beginning of the mixing cycle. The usual additives, such as pigments, fillers, vulcanizing agents, etc., can then be added and the entire compounding performed in one operation. They may be added to any type rubber, whether it is of a natural, synthetic or reclaimed type.

The following Examples are illustrative of the present invention. The processing aids employed in the Examples are as follows:

COMPOUND A (Illustrative of the Compound of
Ser. No. 263,752 Filed June 12, 1972)

10.0 Parts potassium n-dodecylbenzenesulfonate, techn. (mixed isomers)
22.0 Parts stearic acid, techn. rubber grade
10.0 Parts diphenylphthalate, techn.
15.0 Parts tetraethyleneglycol mono-nonylphenol ether, techn.
5.0 Parts tripropyleneglycol, techn.
18.0 Parts potassium stearate, techn.
4.0 Parts zinc oleate, techn.
2.0 Parts cetyl alcohol, techn.
14.0 Parts petrolatum, N. F.

COMPOUND B (Illustrative of this Invention)

10.0 Parts potassium n-dodecylbenzenesulfonate, tech. (mixed isomers)
22.0 Parts stearic acid, techn. rubber grade
10.0 Parts diphenylphthalate, techn.
15.0 Parts tetraethyleneglycol mono-nonylphenolether, techn.
5.0 Parts tripropyleneglycol, techn.
18.0 Parts potassium stearate, techn.
4.0 Parts zinc oleate, techn.
2.0 Parts cetyl alcohol, techn.
14.0 Parts petrolatum, N. F.
0.6 Parts thiodiglycolic acid

COMPOUND C (Illustrative of this Invention)

10.0 Parts potassium n-dodecylbenzenesulfonate, techn. (mixed isomers)
22.0 Parts stearic acid, techn. rubber grade
10.0 Parts diphenylphthalate, techn.
15.0 Parts tetraethyleneglycol mono-nonylphenolether, techn.
5.0 Parts tripropyleneglycol, techn.
18.0 Parts potassium stearate, techn.
4.0 Parts zinc oleate, techn.
2.0 Parts cetyl alcohol, techn.
14.0 Parts petrolatum, N. F.
0.7 Parts thiodipropionic acid

COMPOUND D (Liquid Formula of this Invention)

1.0 Parts thiodiglycolic acid
10.0 Parts tripropylene glycol
23.0 Parts tetraethyleneglycol mono-nonylphenoxyether
10.0 Parts dipropyleneglycol di-benzoate
14.0 Parts paraffinic mineral oil 100/100
20.0 Parts neodecanoic acid
15.0 Parts dodecylphenylsulfonic acid
7.0 Parts triethanolamine 99%

COMPOUND E (Liquid Formula of this Invention)

1.2 Parts thiodipropionic acid
9.8 Parts tripropylene glycol
23.0 Parts tetraethyleneglycol mono-nonylphenoxyether
10.0 Parts dipropyleneglycol di-benzoate
14.0 Parts paraffinic mineral oil 100/100
20.0 Parts neodecanoic acid
15.0 Parts dodecylphenylsulfonic acid
7.0 Parts triethanolamine 99%

COMPOUND F 1.3 Parts methylene bis(thioacetic acid)
7 Parts tripropylene glycol
22 Parts tetraethyleneglycol mono-nonylphenol ether
13.4 Parts dipropyleneglycol dibenzoate
12 Parts paraffinic mineral oil 100/100
18 Parts neodecanoic acid

COMPOUND F-Continued

18 Parts dodecylphenylsulfonic acid
8.4 Parts triethanolamine 99%

COMPOUND G 1.5 Parts dimethyl thiodipropionate
9 Parts tripropylene glycol
24 Parts tetraethyleneglycol mono-monylphenol ether
14 Parts dipropyleneglycol dibenzoate
13.5 Parts paraffinic mineral oil 100/100
18 Parts neodecanoic acid
14 Parts dodecylphenylsulfonic acid
6 Parts triethanolamine 99%

COMPOUND H 2.0 Parts thiodisuccinic acid
9 Parts tripropylene glycol
24 Parts tetraethyleneglycol mono-nonylphenol ether
14 Parts dipropyleneglycol dibenzoate
13 Parts paraffinic mineral oil 100/100
18 Parts neodecanoic acid
14 Parts dodecylphenylsulfonic acid
6.6 Parts triethanolamine 99%

COMPOUND I 1.0 Parts thiodipropionitrile
9 Parts tripropylene glycol
25 Parts tetraethyleneglycol mono-nonylphenol ether
14.5 Parts dipropyleneglycol dibenzoate
14 Parts paraffinic mineral oil 100/100
18 Parts neodecanoic acid
14 Parts dodecylphenylsulfonic acid
6.5 Parts triethanolamine 99%

COMPOUND J 1.5 Parts dibenzyl sulfide
9 Parts tripropylene glycol
25 Parts tetraethyleneglycol mono-nonylphenol ether
14 Parts dipropyleneglycol dibenzoate
14 Parts paraffinic mineral oil 100/100
18 Parts neodecanoic acid
14 Parts dodecylphenylsulfonic acid
6.5 Parts triethanolamine 99%

EXAMPLE I

Three rubber compounds were prepared in a Banbury mixer as follows. Crude natural rubber was added and subjected to mixing. After 1 minute Compound A, B or C was added with finely dividied silica (Hi-Sil). After continuing mixing for an additional 5 minutes, carbon black (F T Black), mineral oil (Circo Light Oil), poly(tetrafluoroethylene) plasticizer (Flexone 3C), microcrystalline wax, zinc oxide and stearic acid were added. After mixing for an additional 3 minutes, the ram was cleaned and after 2 more minutes the batch was dumped. Benzothiazyl disulfide (MBTS) and sulfur accelerators were then added on the mill in 3½ minute's mixing.

Each of the resulting mixtures was inspected visually and was found to be a good dispersion without apparent difference. However, the dump temperatures and the Mooney Viscosities for the two compositions made with the processing aids of this invention, Compounds B and C, were lower than those of the composition employing the processing aid of may prior application (Compound A).

The data for this Example is summarized as follows:

| Compound Component | Compound No. 1 | 2 | 3 |
|---|---|---|---|
| Crude Natural Rubber | 100 | 100 | 100 |
| Compound A | 3.10 | — | — |
| Compound B | — | 3.10 | — |
| Compound C | — | — | 3.10 |
| Hi-Sil | 10.00 | 10.00 | 10.00 |
| F. T. Black | 65.00 | 65.00 | 65.00 |
| Circo Light Oil | 15.00 | 15.00 | 15.00 |
| Flexone 3C | 2.00 | 2.00 | 2.00 |
| Microcrystalline wax | 2.00 | 2.00 | 2.00 |
| Zinc oxide | 5.00 | 5.00 | 5.00 |
| Stearic acid | 2.00 | 2.00 | 2.00 |
| MBTS | 0.60 | 0.60 | 0.60 |
| Sulfur | 2.50 | 2.50 | 2.50 |
| Dump Temp., °F. | 270 | 260 | 260 |
| Mooney Viscosity | [44.0–44.5] | [41.5] | [41.5–42.0] |

EXAMPLE II

Employing procedures similar to those described in Example I, three crude rubber compounds were prepared employing Compounds B, D or E. The formulations were as follows:

| Compound Component | Compound No. 1 | 2 | 3 |
|---|---|---|---|
| Natural Rubber (crude, No. 3 Rib Smoked Sheet) | 100 | 100 | 100 |
| Compound B | 2.0 | — | — |
| Compound D | — | 2.0 | — |
| Compound E | — | — | 2.0 |
| Activated zinc salt of pentachlorothiophenol (ENDOR) | 0.80 | 0.80 | 0.80 |
| Mercaptobenzothiazole (CAPTAX) | 1.46 | 1.46 | 1.46 |
| Benzothiazyl-disulfide (ALTAX) | .66 | .66 | .66 |
| Zinc dimethyldithiocarbamate (METHYL ZYMATE) | .025 | .025 | .025 |
| Tetraethylthiuram disulfide (ETHYL TUADS) | .150 | .150 | .150 |
| Zinc oxide | 5.00 | 5.00 | 5.00 |
| Stearic acid | 1.00 | 1.00 | 1.00 |
| Petrolatum | 2.00 | 2.00 | 2.00 |
| Whiting | 82.50 | 82.50 | 82.50 |
| Sulphur | 2.00 | 2.00 | 2.00 |

For each formulation three measurements of Mooney viscosity were made after 10 minutes of mixing and the values were averaged. The average viscosity achieved with Compound B was 26, while average viscosities of 8.5 and 9.5 were achieved employing Compounds D and E, respectively.

It has been found that the thiodicarboxylic acid also has an effect upon the accelerators employed in the rubber compound, causing increased curing. Accordingly, the amount of accelerator can be reduced by from about 10 to about 20 to avoid the risk of overcuring.

EXAMPLE III

Employing procedures similar to those described in Example I, eight crepe rubber compounds were prepared employing Compounds B, D, E, F, G, H, I and J. The mixing time and dump temperatures were recorded and the Mooney viscosity and the radiograph dispersion rating for each of the resulting rubber compounds were determined. The data for these experiments are summarized as follows:

| COMPOUND COMPONENT | COMPOUND NO. | | | | | | | |
|---|---|---|---|---|---|---|---|---|
| | 1 | 2 | 3 | 4 | 5 | 6 | 7 | 8 |
| Pale crepe, pts | 300 | 300 | 300 | 300 | 300 | 300 | 300 | 300 |
| Stearic acid, pts | 15 | 15 | 15 | 15 | 15 | 15 | 15 | 15 |
| Zinc oxide, pts | 15 | 15 | 15 | 15 | 15 | 15 | 15 | 15 |
| Fine clay, pts | 450 | 450 | 450 | 450 | 450 | 450 | 450 | 450 |
| a-Pinene resin, pts | 25 | 25 | 25 | 25 | 25 | 25 | 25 | 25 |
| Sulfur, pts | 9 | 9 | 9 | 9 | 9 | 9 | 9 | 9 |
| Dibenzthiazyldisulfide, pts | 3.3 | 3.3 | 3.3 | 3.3 | 3.3 | 3.3 | 3.3 | 3.3 |
| Compound B, pts | 8 | — | — | — | — | — | — | — |
| Compound D, pts | — | 8 | — | — | — | — | — | — |
| Compound E, pts | — | — | 8 | — | — | — | — | — |
| Compound F, pts | — | — | — | 8 | — | — | — | — |
| Compound G, pts | — | — | — | — | 8 | — | — | — |
| Compound H, pts | — | — | — | — | — | 8 | — | — |
| Compound I, pts | — | — | — | — | — | — | 8 | — |
| Compound J, pts | — | — | — | — | — | — | — | 8 |
| TEST DATA | | | | | | | | |
| Mixing time, Minutes | 12 | 8 | 8 | 9 | 9 | 10 | 7 | 8 |
| Dump Temperature, °F | 220 | 210 | 210 | 215 | 212 | 215 | 210 | 215 |
| Mooney Viscosity | 8 | 6 | 6 | 4 | 5 | 5 | 4 | 4 |
| Radiograph Dispersion Rating | 21.8 | 22.7 | 21.9 | 22.2 | 27.5 | 17.8 | 14.5 | 24.2 |

What is claimed is:

1. An improved rubber processing aid comprising:
   a. an alkali or amine salt of an aromatic sulfonic acid having the general formula:

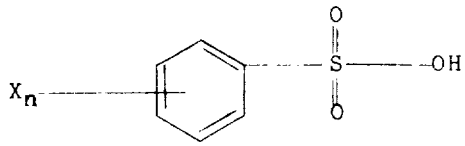

wherein X can be either hydrogen or branched or straight chain alkyl group having from 4 to 14 carbon atoms, and n has a value of from 1 to 5; and
   b. a long chain fatty acid having a maximum of about 22 carbon atoms in the chain, wherein the amount by weight of said fatty acid present is at least equal to the amount by weight of said sulfonic acid salt, the improvement wherein said processing aid includes a thioether in an amount sufficient to catalyze the peptizing action of said salt.

2. A composition according to claim 1 wherein said thioether is a thiodicarboxylic acid or an ether thereof of the formula

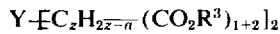

wherein Y is sulfur or $-SC_xH_{2x}S-$; x has a value of from 1 to 5; z has a value of from 1 to 2; a has a value of from 0 to 1; and $R_3$ is hydrogen or lower alkyl.

3. A composition according to claim 2 wherein said thioether is thiodiglycolic acid.

4. A composition according to claim 2 wherein said thioether is thiodipropionic acid.

5. A composition according to claim 2 wherein said thioether is methylene bis(thioacetic acid).

6. A composition according to claim 2 wherein said thioether is dimethyl thiodipropionate.

7. A composition according to claim 2 wherein said thioether is thiodisuccinic acid.

8. A composition according to claim 1 wherein said thioether is thiodipropionitrile.

9. A composition according to claim 1 wherein said

10. A composition according to claim 1 to which are added additional materials including aromatic esters, compounds with alcoholic and glycolic hydroxyl groups, potassium or sodium soaps of fats or fatty acids, a fatty acid, a metal soap of zinc, magnesium, calcium or barium, and a paraffin.

11. A composition according to claim 10 comprising from about 3 to about 15 percent of the alkali salt of said aromatic sulfonic acid, about 5 to about 25 percent of said long chain fatty organic acid, about 0.5 to about 1.5 percent thioether, about 7 to about 15 percent diphenylphthalate, about 10 to about 20 percent tetraethyleneglycol mono-nonylphenol ether, about 5 to about 10 percent tripropyleneglycol, about 5 to about 20 percent potassium stearate, about 4 to about 10 percent zinc oleate, up to 5 percent cetyl alcohol, and about 15 to about 20 percent petrolatum.

12. A liquid composition according to claim 10 comprising from about 20 to about 25 percent of the amine salt of said aromatic sulfonic acid, about 15 to about 25 percent of said long chain fatty organic acid, about 0.5 to about 15 percent thioether, about 5 to about 15 percent dipropyleneglycol dibenzoate, about 20 to about 25 percent tetraethylene glycol mono-nonylphenyl ether, about 5 to about 15 percent tripropylene glycol, and about 10 percent to about 20 percent mineral oil.

13. An improved rubber composition comprising a rubber base and rubber additives, wherein the improvement comprises a small but effective amount of a composition according to claim 1.

14. An improved method for compounding rubber comprising admixing rubber with an additive of the class consisting of pigments, fillers and vulcanizing agents, wherein the improvement comprises admixing a composition according to claim 1 with rubber at the beginning of the mixing cycle prior to mastication of the rubber and no later than the time when said rubber is admixed with said additive.

15. A composition according to claim 1 wherein said thioether has a boiling point in excess of 130°C and has the formula $$R^1 - Y - R^2$$

wherein Y is S or $-SC_xH_{2x}S-$; x has a value of from 1 to 5; and each of $R^1$ and $R^2$ is alkyl, aryl, alkaryl, aralkyl and substituted alkyl, aryl, alkaryl and aralkyl, said substituents being ether oxygen, carbonyl oxygen, cyano, amine nitrogen, and amide groups, each of said $R^1$ and $R^2$ containing no more than 12 carbon atoms.

16. A composition according to claim 15 wherein Y is $-S-$.

17. A composition according to claim 15 wherein Y is $-SCH_2S-$.

* * * * *